(12) United States Patent
Faucher et al.

(10) Patent No.: US 8,618,192 B2
(45) Date of Patent: Dec. 31, 2013

(54) PROCESSES FOR PRODUCING POLYESTER LATEXES VIA SOLVENT-FREE EMULSIFICATION

(75) Inventors: Santiago Faucher, Oakville (CA); Joo T. Chung, Webster, NY (US); Timothy L. Lincoln, Rochester, NY (US); Shigang Qiu, Toronto (CA); Yuhua Tong, Webster, NY (US); Fumii Higuchi, Mississauga (CA); Emine Irmak Serifoglu, Mississauga (CA); Allan K. Chen, Oakville (CA); Brian J. Andaya, Ontario, NY (US); Joseph L. Leonardo, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/701,118

(22) Filed: Feb. 5, 2010

(65) Prior Publication Data
US 2011/0196066 A1 Aug. 11, 2011

(51) Int. Cl.
C08C 1/08 (2006.01)
(52) U.S. Cl.
USPC .......................................................... 523/335
(58) Field of Classification Search
USPC .......................................................... 523/335
See application file for complete search history.

(56) References Cited

U.S. PATENT DOCUMENTS

| | | |
|---|---|---|
| 3,590,000 A | 6/1971 | Palermiti et al. |
| 3,655,374 A | 4/1972 | Palermiti et al. |
| 3,720,617 A | 3/1973 | Chatterji et al. |
| 3,800,588 A | 4/1974 | Larson et al. |
| 3,847,604 A | 11/1974 | Hagenbach et al. |
| 3,933,954 A | 1/1976 | Gebhard et al. |
| 3,944,493 A | 3/1976 | Jadwin et al. |
| 3,983,045 A | 9/1976 | Jugle et al. |
| 4,007,293 A | 2/1977 | Mincer et al. |
| 4,056,653 A | 11/1977 | Gebhard et al. |
| 4,079,014 A | 3/1978 | Burness et al. |
| 4,265,990 A | 5/1981 | Stolka et al. |
| 4,295,990 A | 10/1981 | Verbeek et al. |
| 4,298,672 A | 11/1981 | Lu |
| 4,338,390 A | 7/1982 | Lu |
| 4,394,430 A | 7/1983 | Jadwin et al. |
| 4,560,635 A | 12/1985 | Hoffend et al. |
| 4,563,408 A | 1/1986 | Lin et al. |
| 4,584,253 A | 4/1986 | Lin et al. |
| 4,858,884 A | 8/1989 | Harwath |
| 4,935,326 A | 6/1990 | Creatura et al. |
| 4,937,166 A | 6/1990 | Creatura et al. |
| 5,227,460 A | 7/1993 | Mahabadi et al. |
| 5,236,629 A | 8/1993 | Mahabadi et al. |
| 5,278,020 A | 1/1994 | Grushkin et al. |
| 5,290,654 A | 3/1994 | Sacripante et al. |
| 5,302,486 A | 4/1994 | Patel et al. |
| 5,308,734 A | 5/1994 | Sacripante et al. |
| 5,330,874 A | 7/1994 | Mahabadi et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,354,804 A | 10/1994 | Inada et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,399,597 A | 3/1995 | Mandel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,548,004 A | 8/1996 | Mandel et al. |
| 5,585,215 A | 12/1996 | Ong et al. |
| 5,650,255 A | 7/1997 | Ng et al. |
| 5,650,256 A | 7/1997 | Veregin et al. |
| 5,843,614 A | 12/1998 | Shinzo et al. |
| 5,853,943 A | 12/1998 | Cheng et al. |
| 5,885,743 A | 3/1999 | Takayanagi et al. |
| 5,902,710 A | 5/1999 | Ong et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 5,994,020 A | 11/1999 | Patel et al. |
| 6,004,714 A | 12/1999 | Ciccarelli et al. |
| 6,063,827 A | 5/2000 | Sacripante et al. |
| 6,074,796 A | 6/2000 | Matsuoka et al. |
| 6,080,807 A | 6/2000 | Campbell |
| 6,190,815 B1 | 2/2001 | Ciccarelli et al. |
| 6,214,507 B1 | 4/2001 | Sokol et al. |
| 6,248,491 B1 | 6/2001 | Takayanagi et al. |
| 6,512,024 B1 | 1/2003 | Thumma et al. |
| 6,593,049 B1 | 7/2003 | Veregin et al. |
| 6,756,176 B2 | 6/2004 | Stegamat et al. |
| 6,830,860 B2 | 12/2004 | Sacripante et al. |
| 6,894,090 B2 | 5/2005 | Shinzo et al. |
| 7,064,156 B2 | 6/2006 | Rink et al. |
| 7,329,476 B2 | 2/2008 | Sacripante et al. |
| 7,385,001 B2 | 6/2008 | Shim et al. |
| 7,547,499 B2 | 6/2009 | Veregin et al. |
| 2002/0074681 A1 | 6/2002 | Lundgard |
| 2006/0286478 A1 | 12/2006 | Chung et al. |
| 2007/0088117 A1 | 4/2007 | Zhou et al. |
| 2007/0141494 A1 | 6/2007 | Zhou et al. |
| 2009/0208864 A1 | 8/2009 | Zhou |
| 2009/0246680 A1 | 10/2009 | Chung |

FOREIGN PATENT DOCUMENTS

| | | |
|---|---|---|
| WO | 9845356 | 10/1998 |
| WO | 0017256 | 3/2000 |

Primary Examiner — Edward Cain
(74) Attorney, Agent, or Firm — MDIP LLC

(57) ABSTRACT

A process for making a latex emulsion suitable for use in a toner composition includes contacting at least one amorphous polyester resin with a viscosity reducing additive in the absence of an organic solvent to form a resin mixture either via an extruder or batch process, and adding a surfactant, neutralizing agent, and deionized water to the resin mixture.

17 Claims, 13 Drawing Sheets

PROCESSES FOR PRODUCING POLYESTER LATEXES VIA SOLVENT-FREE EMULSIFICATION

TECHNICAL FIELD

The present disclosure relates to processes for producing resin emulsions useful in producing toners. More specifically, solvent-free processes are provided for emulsifying amorphous and crystalline polyester resins.

BACKGROUND

Numerous processes are within the purview of those skilled in the art for the preparation of toners. Emulsion aggregation (EA) is one such method. Emulsion aggregation toners may be used in forming print and/or xerographic images. Emulsion aggregation techniques may involve the formation of a polymer emulsion by heating a monomer and undertaking a batch or semi-continuous emulsion polymerization, as disclosed in, for example, U.S. Pat. No. 5,853,943, the disclosure of which is hereby incorporated by reference in its entirety. Other examples of emulsion/aggregation/coalescing processes for the preparation of toners are illustrated in U.S. Pat. Nos. 5,902,710; 5,910,387; 5,916,725; 5,919,595; 5,925,488, 5,977,210, 5,994,020, and U.S. Patent Application Publication No. 2008/0107989, the disclosures of each of which are hereby incorporated by reference in their entirety.

Polyester toners have been prepared utilizing amorphous and crystalline polyester resins as illustrated, for example, in U.S. Patent Application Publication No. 2008/0153027, the disclosure of which is hereby incorporated by reference in its entirety. The incorporation of these polyesters into the toner requires that they first be formulated into emulsions prepared by solvent containing batch processes, for example solvent flash emulsification and/or solvent-based phase inversion emulsification (PIE), which is both time and energy-consuming. In both cases, large amounts of organic solvents, such as ketones or alcohols, have been used to dissolve the resins, which may require subsequent energy intensive distillation to form the latexes, and are not environmentally friendly.

Solventless latex emulsions have been formed in either a batch or extrusion process through the addition of a neutralizing solution, a surfactant solution and water to a thermally softened resin as illustrated, for example, in U.S. patent application Ser. Nos. 12/032,173 and 12/056,529, the disclosures of each of which are hereby incorporated by reference in their entirety. However, amorphous resins may be difficult to process without the use of a solvent in that they do not exhibit a sharp melting point and even at 100° C., exhibit substantial viscosities which may work against the formation of emulsions. Solvents may be added to amorphous resins to reduce the viscosity and permit necessary reorientation of chain end, which may stabilize and form particles which lead to the formation of stable latexes. The additional process step of distillation to remove the solvent is, however, not desirable, as it adds complexity, energy consumption and cost.

It would be advantageous to provide a solvent-free process for the preparation of a polymer latex suitable for use in a toner product that is more efficient, takes less time, and has a high product yield.

SUMMARY

A process of the present disclosure includes contacting at least one amorphous polyester resin with a viscosity reducing additive including a crystalline polyester resin in the absence of an organic solvent, to form a resin mixture having a softening point temperature of from about 95° C. to about 120° C.; contacting the resin mixture with a surfactant and a neutralizing agent; melt mixing the mixture; contacting the melt mixed mixture with de-ionized water to form an emulsion; and continuously recovering latex particles.

Processes of the present disclosure also include contacting at least one crystalline polyester resin with at least one amorphous polyester resin, in the absence of an organic solvent, to form a resin mixture having a softening point temperature of from about 95° C. to about 120° C.; contacting the mixture with a surfactant and a neutralizing agent; melt mixing the mixture; contacting the melt mixed mixture with de-ionized water to form an oil in water emulsion; and continuously recovering latex particles having a coarse content of from about 0.01% to about 3%.

In embodiments, the processes of the present disclosure also may include the step of contacting the latex particles with an optional colorant, an optional wax, and a second amorphous polyester resin to form a shell over the latex particles, thereby forming toner particles.

BRIEF DESCRIPTION OF DRAWINGS

Various embodiments of the present disclosure will be described herein below with reference to the figures wherein.

DETAILED DESCRIPTION

Figure 1:
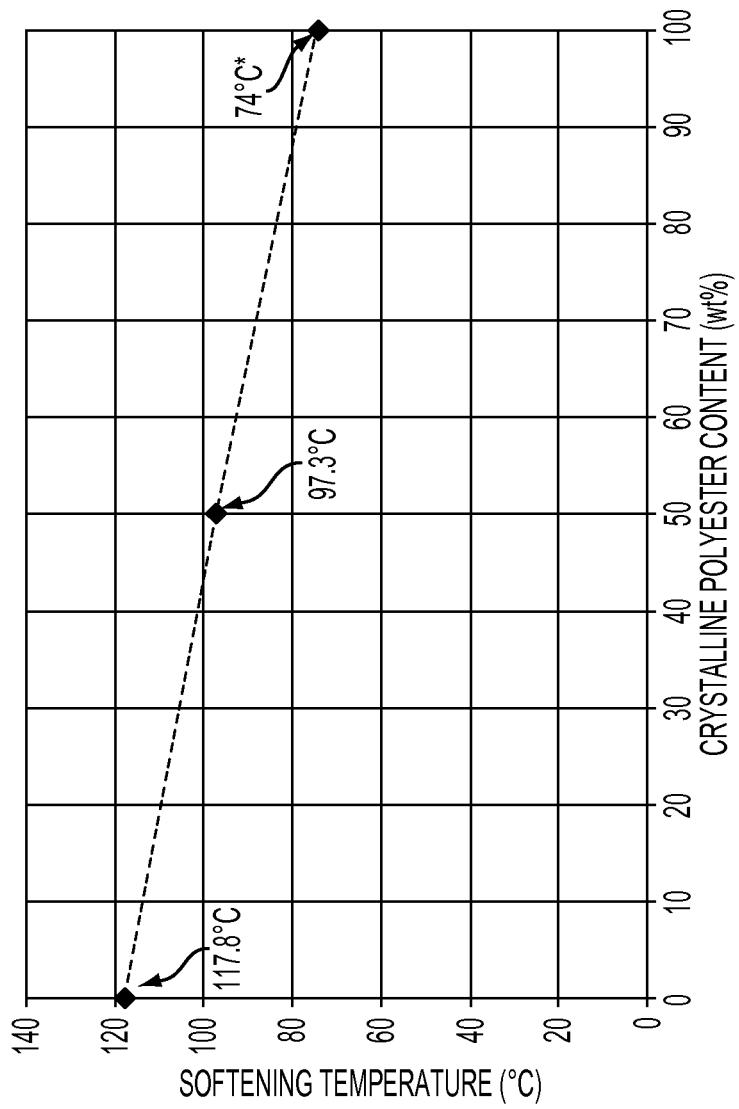
FIG. 1 is a graph depicting softening point of a resin mixture composition in accordance with the present disclosure as measured by a Metler-Toledo softening point measurement apparatus.

The present disclosure provides solvent free processes for forming high yield, low coarse content, polyester latexes which may be utilized in forming a toner.

In embodiments, the present disclosure provides a process which includes contacting at least one amorphous polyester resin with a viscosity reducing additive, in the absence of an organic solvent to form a resin mixture; contacting the resin mixture with a surfactant and a neutralizing agent; melt mixing the mixture; contacting the melt mixed mixture with de-ionized water to form an emulsion; and continuously recovering latex particles.

In embodiments, the present disclosure provides a process which includes contacting at least one crystalline polyester resin with at least one amorphous polyester resin in the absence of an organic solvent to form a resin mixture, having a softening point of from about 60° C. to about 130° C.; contacting the mixture with a surfactant and a neutralizing agent; melt mixing the mixture; contacting the melt mixed mixture with de-ionized water to form an oil in water emulsion; and continuously recovering latex particles having a coarse content of from about 0% to about 3%.

The addition of a viscosity reducing additive such as a crystalline polyester resin to an amorphous polyester resin allows the amorphous polyester resin to be emulsified in a solvent-free process. Without the crystalline component, the amorphous resin does not emulsify under the same solvent-free experimental conditions. This is because the amorphous resins do not exhibit a sharp melting point and, even at 100° C., exhibit substantial viscosities. Viscous forces act against the formation of emulsions as is evident in the solvent based phase inversion emulsification (PIE) process currently practiced, since solvents are added to reduce viscosity and permit the necessary reorientation of chain ends to stabilize and form particles which lead to the formation of stable latexes without surfactant. Therefore, a solvent free process for the production of a latex emulsion from an amorphous resin has been difficult to achieve due to the high viscosities of the amorphous resins.

From an environmental perspective the solvent-based phase inversion emulsification (PIE) process is less desirable than a solvent-free process that avoids solvent all together (a solvent-free process). The energy required to distill the solvent, and thus the associated carbon footprint, are large given the latent heat of vaporization to be overcome. Following distillation, a small concentration of the solvent remains in the latex and thus must be addressed in the design of the downstream waste water system. Therefore, the use of solvents creates a less efficient, less desirable, and costly system of producing latexes.

In accordance with the present disclosure, a viscosity reducing additive, in embodiments, a crystalline polyester resin may be added to an amorphous polyester resin, which lowers the softening temperature of the resin such that at temperatures near the boiling point of water, the viscosity of the melt mix is low enough to form an emulsion via a solvent-free process. The addition of the viscosity reducing additive to the amorphous polyester reduces the viscosity of amorphous resins sufficiently to permit a solvent-free emulsification of the amorphous resin. That is, in a solvent-free process, the viscosity reducing additive, in embodiments, a crystalline polyester, acts as a solvent for the amorphous polyester much in the same way that an additional solvent is used in conventional solvent PIE processes. Thus, the present disclosure provides a single, solvent-free latex, containing both amorphous and crystalline resins, which greatly simplifies latex production and delivery. Furthermore, the present disclosure permits the production of solvent-free amorphous latexes for the core of a toner, and thus allows a large quantity of the resin (in embodiments, about 67%) to be produced in a solvent-free manner with commercial and environmental advantages.

In addition, in contrast to the solvent based PIE processes, the viscosity reducing additive can remain in the product and does not need to be separated out of the latex. This eliminates distillation time, waste disposal, and costs associated with the use of solvents. This method can be practiced in both continuous and batch solvent-free emulsification processes.

As used herein, "the absence of an organic solvent" includes, in embodiments, for example, that organic solvents are not used to dissolve the resin or neutralizing agent for emulsification. However, it is understood that minor amounts of such solvents may be present in such resins as a consequence of their use in the process of forming the resin.

Resins

Any resin may be utilized in forming a latex emulsion of the present disclosure. In embodiments, the resins may be an amorphous resin, a crystalline resin, and/or a combination thereof. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), polypropylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 1 to about 50 percent by weight of the toner components, in embodiments from about 5 to about 35 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of for example, from about 2,000 to about 50,000, in embodiments from about 5,000 to about 25,000, and a weight average molecular weight ($M_w$) of, for example, from about 3,000 to about 100,000, in embodiments from about 5,000 to about 80,000, as determined by Gel Permeation Chromatography using polystyrene standards. The molecular weight distribution)($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

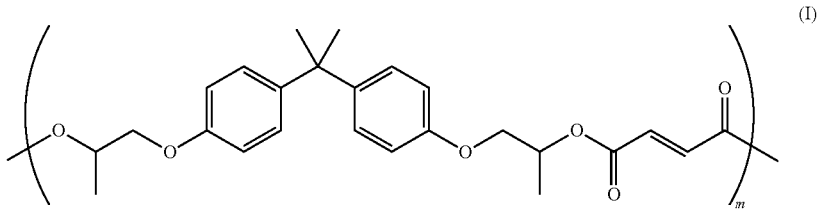

wherein m may be from about 5 to about 1000. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

Suitable crystalline resins which may be utilized, optionally in combination with an amorphous resin as descried above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

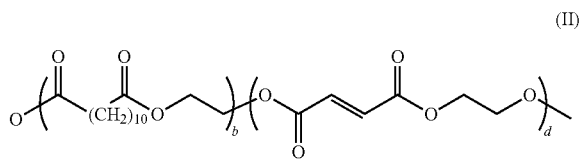

(II)

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

The amorphous resin may be present, for example, in an amount of from about 30 to about 90 percent by weight of the toner components, in embodiments from about 40 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin).

In embodiments, a suitable toner of the present disclosure may include 2 amorphous polyester resins and a crystalline polyester resin. The weight ratio of the three resins may be from about 29% first amorphous resin/69% second amorphous resin/2% crystalline resin, to about 60% first amorphous resin/20% second amorphous resin/20% crystalline resin.

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Neutralizing Agent

In embodiments, the resin may be mixed with a weak base or neutralizing agent. In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof, and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

In embodiments, an emulsion formed in accordance with the present disclosure may also include a small quantity of water, in embodiments, de-ionized water (DIW), in amounts of from about 30% to about 95%, in embodiments, of from about 50% to about 85%, at temperatures that melt or soften the resin, of from about 40° C. to about 140° C., in embodiments from about 60° C. to about 100° C.

The basic agent may be utilized in an amount of from about 0.001% by weight to 50% by weight of the resin, in embodiments from about 0.01% by weight to about 25% by weight of the resin, in embodiments from about 0.1% by weight to 5% by weight of the resin.

As noted above, the basic neutralization agent may be added to a resin possessing acid groups. The addition of the basic neutralization agent may thus raise the pH of an emulsion including a resin possessing acid groups from about 5 to about 12, in embodiments, from about 6 to about 11. The neutralization of the acid groups may, in embodiments, enhance formation of the emulsion.

Surfactants

In embodiments, the process of the present disclosure may include adding a surfactant, before or during the melt mixing, to the resin at an elevated temperature. In embodiments, the surfactant may be added prior to melt-mixing the resin at an elevated temperature.

Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, in embodiments, from about 0.1% to about 16% by weight of the resin, in other embodiments, from about 1% to about 14% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy)ethanol, available from Rhone-Poulenc as IGEPAL CA210™, IGEPAL CA520™, IGEPAL CA720™, IGEPAL CO890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

Processing

As noted above, the present process includes melt mixing a mixture at an elevated temperature containing at least one amorphous resin, a viscosity reducing agent, in embodiments, at least one crystalline resin, a surfactant, and a neutralizing agent, wherein an organic solvent is not utilized in the process, to form a latex emulsion. In embodiments, the resins may be pre-blended prior to melt mixing. In embodiments, the resins may be co-fed into a screw feeder of an extruder.

More than one resin may be utilized in forming the latex. As noted above, the resin may be an amorphous resin, a crystalline resin, or a combination thereof. In embodiments, the resin may be an amorphous resin and the elevated temperature may be a temperature above the glass transition temperature of the amorphous resin. In other embodiments, the resin may be a crystalline resin and the elevated temperature may be a temperature above the melting point of the crystalline resin. In further embodiments, the resin may be a mixture of amorphous and crystalline resins and the temperature may be above the glass transition temperature of the mixture.

In embodiments, at least one amorphous polyester resin is contacted with a viscosity reducing additive to reduce the viscosity of the at least one amorphous resin, in the absence of an organic solvent to form a resin mixture. As noted above, in embodiments, the viscosity reducing additive may be a crystalline polyester resin.

In embodiments, the viscosity reducing additive may lower the softening temperature of the amorphous resin so that the amorphous resin has a softening temperature of from about 90° C. to about 130° C., in embodiments, from about 95° C. to about 120° C.

In embodiments, the viscosity reducing additive is present in an amount of from about 2 percent by weight to about 50 percent by weight of the resin mixture, in embodiments of from about 5 percent by weight to about 45 percent by weight, and the at least one amorphous polyester resin is present in an amount of from about 50 percent by weight to about 98 percent by weight of the resin mixture, in embodiments of from about 55 percent by weight to about 95 percent by weight.

In embodiments, the neutralizing agent which may be utilized includes the agents mentioned hereinabove. In embodiments, the surfactant utilized may be any of the surfactants mentioned hereinabove to ensure that proper resin neutralization occurs and leads to a high quality latex with low coarse content.

In embodiments, the surfactant may be added to the one or more ingredients of the resin composition before, during, or after melt-mixing. In embodiments, the surfactant may be added before, during, or after the addition of the neutralizing agent. In embodiments, the surfactant may be added prior to the addition of the neutralizing agent. In embodiments, a surfactant may be added to the pre-blend mixture prior to melt mixing.

The elevated temperature may be from about 30° C. to about 300° C., in embodiments from about 50° C. to about 200° C., in other embodiments from about 70° C. to about 150° C.

Melt mixing may be conducted in an extruder, i.e. a twin screw extruder, a kneader such as a Haake mixer, a batch reactor, or any other device capable of intimately mixing viscous materials to create near homogenous mixtures.

Emulsion Formation

Once the resins, neutralizing agent and surfactant are melt mixed, the mixture may then be contacted with water, to form a latex emulsion. Water may be added in order to form a latex with a solids content of from about 10% to about 50%, in embodiments, of from about 20% to about 40%. While higher water temperatures may accelerate the dissolution process, latexes can be formed at temperatures as low as room temperature. In other embodiments, water temperatures may be from about 40° C. to about 110° C., in embodiments, from about 50° C. to about 100° C.

Figure 3:
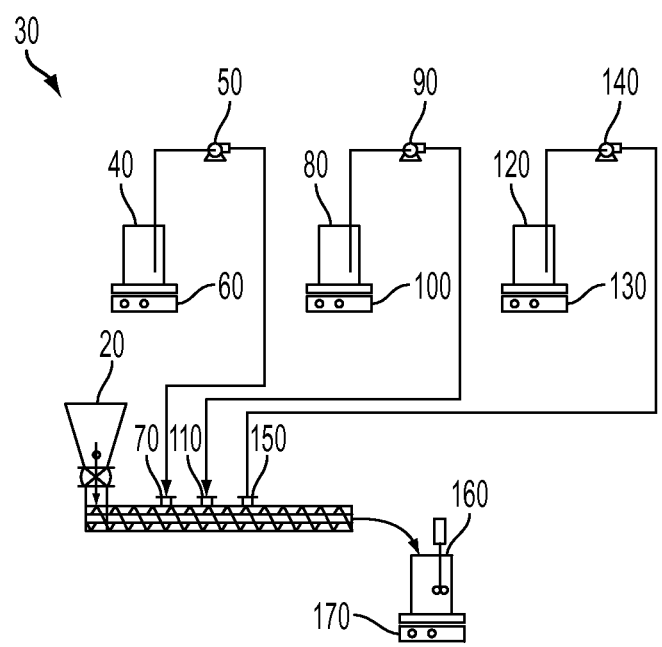
FIG. 3 is a flow chart depicting an extruder process for the preparation of a polyester latex in accordance with Example 1 of the present disclosure.

Contact between the water and the resin mixture may be achieved in any suitable manner, such as in a vessel or continuous conduit, in a packed bed. In embodiments, a solvent free extruder process is utilized as shown in FIG. 3, and as further described below in Example 1. In embodiments, as the resin mixture travels down the extruder, water may be added at an injection port. In embodiments, water may be added at three subsequent ports. This may be advantageous so that the transition from a water in oil to an oil in water emulsion may be gradual, ensuring that the materials continued to mix rather than phase separate, and to optimize emulsion formation in the extruder. In embodiments, the port may inject preheated de-ionized water into the extruder at rates appropriate to achieve the solids content desired in the final latex. In embodiments, the port may inject preheated de-ionized water into the extruder at rates of from about 40 ml/minute to about 500 ml/minute, in embodiments, of from about 100 ml/minute to about 400 ml/minute.

The product exiting from the extruder may include a stream of latex collected in a preheated water bath with gentle agitation before being discharged for storage and later use in the aggregation/coalescence process described below.

In other embodiments, as for example, in a batch process, the melt-mixed product exiting the mixer may be cooled, crushed, and then added to a kettle with preheated deionized water to form the latex.

The particle size of the latex emulsion formed can be controlled by the concentration ratio of surfactant and neutralizing agent to polyester resin. The solids concentration of the latex may be controlled by the ratio of the resin mixture to the water.

In accordance with the present disclosure, it has been found that the processes herein may produce emulsified resin particles that retain the same molecular weight properties of the starting resin, in embodiments, the pre-made resins utilized in forming the emulsion.

The emulsified resin particles in the aqueous medium may have a size of about 1500 nm or less, such as from about 10 nm to about 1200 nm, in embodiments from about 30 nm to about 1000 nm.

Particle size distribution of a latex of the present disclosure may be from about 30 nm to about 500 nm, in embodiments, from about 125 nm to about 200 nm.

The coarse content of the latex of the present disclosure may be from about 0.01% by weight to about 3% by weight, in embodiments, from about 0.1% by weight to about 1% by weight. The solids content of the latex of the present disclosure may be from about 10% by weight to about 50% by weight, in embodiments, from about 20% by weight to about 40% by weight.

Following emulsification, additional surfactant, water, and/or neutralizing agent may optionally be added to dilute the emulsion, although this is not required. Following emulsification, the emulsion may be cooled to room temperature, for example from about 20° C. to about 25° C.

The latex emulsions of the present disclosure offer several advantages including, for example, low coarse content, tight particle size distributions and particle sizes appropriate for emulsion aggregation toner manufacturing; no homogenizers or other dispersing devices required for the preparation of latexes; no filtration to eliminate coarse particles; and no time necessary for solvent distillation time.

The latex emulsions of the present disclosure may then be utilized to produce particle sizes that are suitable for emulsion aggregation ultra low melt processes, using a combination of crystalline and amorphous polyester resins. The latexes may be produced with a low coarse content without the use of homogenization or filtration.

Toner

Once the resin mixture has been contacted with water to form an emulsion as described above, the resulting latex may then be utilized to form a toner by any method within the purview of those skilled in the art. The latex emulsion may be contacted with a colorant, optionally in a dispersion, and other additives to form an ultra low melt toner by a suitable process, in embodiments, an emulsion aggregation and coalescence process.

In embodiments, the latex emulsion utilized to form a toner may include both the amorphous resin and a viscosity reducing additive, in embodiments, a crystalline resin.

In embodiments, the optional additional ingredients of a toner composition including colorant, wax, and other additives, may be added before, during or after melt mixing the resin to form the latex emulsion of the present disclosure. The additional ingredients may be added before, during or after formation of the latex emulsion. In further embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. In embodiments, the colorant may be included in the toner in an amount of, for example, about 0.1 to about 35% by weight of the toner, or from about 1 to about 15% by weight of the toner, or from about 3 to about 10% by weight of the toner, although the amount of colorant can be outside of these ranges.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

In general, suitable colorants may include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann of Canada), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR2673 (Paul Uhlrich), Paliogen Yellow 152 and 1560 (BASF), Lithol Fast Yellow 0991K (BASF), Paliotol Yellow 1840 (BASF), Novaperm Yellow FGL (Hoechst), Permanerit Yellow YE 0305 (Paul Uhlrich), Lumogen Yellow D0790 (BASF), Sunsperse Yellow YHD 6001 (Sun Chemicals), Suco-Gelb 1250

(BASF), Suco-Yellow D1355 (BASF), Suco Fast Yellow D1165, D1355 and D1351 (BASF), Hostaperm Pink E™ (Hoechst), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing, and the like.

Other suitable water based colorant dispersions include those commercially available from Clariant, for example, Hostafine Yellow GR, Hostafine Black T and Black TS, Hostafine Blue B2G, Hostafine Rubine F6B and magenta dry pigment such as Toner Magenta 6BVP2213 and Toner Magenta EO2 which may be dispersed in water and/or surfactant prior to use.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600X and GHD 6004X (Pigment Green 7 74260), Sunsperse QHD 6040X (Pigment Red 122 73915), Sunsperse RHD 9668X (Pigment Red 185 12516), Sunsperse RHD 9365X and 9504X (Pigment Red 57 15850: 1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water based pigment dispersions from Sun Chemicals, Heliogen Blue L6900™, D6840™, D7080™, D7020™, Pylam Oil Blue™, Pylam Oil Yellow™, Pigment Blue 1™ available from Paul Uhlich & Company, Inc., Pigment Violet 1™, Pigment Red 48™, Lemon Chrome Yellow DCC 1026™, E.D. Toluidine Red™ and Bon Red C™ available from Dominion Color Corporation, Ltd., Toronto, Ontario, Novaperm Yellow FGL™, and the like. Generally, colorants that can be selected are black, cyan, magenta, or yellow, and mixtures thereof. Examples of magentas are 2,9-dimethyl-substituted quinacridone and anthraquinone dye identified in the Color Index as CI-60710, CI Dispersed Red 15, diazo dye identified in the Color Index as CI-26050, CI Solvent Red 19, and the like. Illustrative examples of cyans include copper tetra(octadecyl sulfonamido) phthalocyanine, x-copper phthalocyanine pigment listed in the Color Index as CI-74160, CI Pigment Blue, Pigment Blue 15:3, and Anthrathrene Blue, identified in the Color Index as CI-69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

In embodiments, a pigment or colorant may be employed in an amount of from about 1% by weight to about 35% by weight of the toner particles on a solids basis, in other embodiments, from about 5% by weight to about 25% by weight. However, amounts outside these ranges can also be used, in embodiments.

Wax

Optionally, a wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the toner particles, in embodiments from about 5% by weight to about 20% by weight of the toner particles, although the amount of wax can be outside of these ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 300 nm.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkyl zinc, dialkyl zinc, zinc oxides, stannous oxide, dibutyltin oxide, dibutyltin oxide hydroxide, tetraalkyl tin, combinations thereof, and the like. Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0% to about 10% by weight, in embodiments from about 0.2% to about 8% by weight, in other embodiments from about 0.5% to about 5% by weight, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time of from about 0.5 hours to about 6 hours, in embodiments from about hour 1 to about 5 hours, while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

Once the desired final size of the toner particles is achieved, the pH of the mixture may be adjusted with a base to a value of from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

Shell Resin

In embodiments, after aggregation, but prior to coalescence, a resin coating may be applied to the aggregated particles to form a shell thereover. In embodiments, the core may thus include an amorphous resin and a viscosity reducing additive, in embodiments, a crystalline resin, as described above. Any resin described above may be utilized as the shell.

In embodiments, a polyester amorphous resin latex as described above may be included in the shell. In embodiments, the polyester amorphous resin latex described above may be combined with a different resin, and then added to the particles as a resin coating to form a shell.

In embodiments, resins which may be utilized to form a shell include, but are not limited to, a crystalline resin latex described above, and/or the amorphous resins described above. In embodiments, an amorphous resin which may be utilized to form a shell in accordance with the present disclosure includes an amorphous polyester, optionally in combination with a crystalline polyester resin latex described above. Multiple resins may be utilized in any suitable amounts. In embodiments, a first amorphous polyester resin, for example an amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments, a second resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any method within the purview of those skilled in the art. In embodiments, the resins utilized to form the shell may be in an emulsion including any surfactant described above. The emulsion possessing the resins, optionally the solvent free crystalline polyester resin latex neutralized with NaOH described above, may be combined with the aggregated particles described above so that the shell forms over the aggregated particles.

The formation of the shell over the aggregated particles may occur while heating to a temperature of from about 30° C. to about 80° C., in embodiments from about 35° C. to about 70° C. The formation of the shell may take place for a period of time of from about 5 minutes to about 10 hours, in embodiments from about 10 minutes to about 5 hours.

Coalescence

Following aggregation to the desired particle size and application of any optional shell, the particles may then be coalesced to the desired final shape, the coalescence being achieved by, for example, heating the mixture to a temperature of from about 45° C. to about 100° C., in embodiments from about 55° C. to about 99° C., which may be at or above the glass transition temperature of the resins utilized to form the toner particles, and/or reducing the stirring, for example to from about 100 rpm to about 1,000 rpm, in embodiments from about 200 rpm to about 800 rpm. Coalescence may be accomplished over a period of from about 0.01 to about 9 hours, in embodiments from about 0.1 to about 4 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include positive or negative charge control agents, for example in an amount of from about 0.1 to about 10% by weight of the toner, in embodiments from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may optionally also be used as an external additive for providing lubricating properties, developer conductivity, tribo enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount of from about 0.1% by weight to about 5% by weight of the toner, in embodiments of from about 0.25% by weight to about 3% by weight of the toner, although the amount of additives can be outside of these ranges. In embodiments, the toners may include, for example, from about 0.1% by weight to about 5% by weight titania, from about 0.1% by weight to about 8% by weight silica, and from about 0.1% by weight to about 4% by weight zinc stearate.

Suitable additives include those disclosed in U.S. Pat. Nos. 3,590,000, 3,800,588, and 6,214,507, the disclosures of each of which are hereby incorporated by reference in their entirety.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Comparative Example 1

Solvent-free emulsification of an amorphous polyester resin via extrusion in the absence of a crystalline resin.

Figure 2:
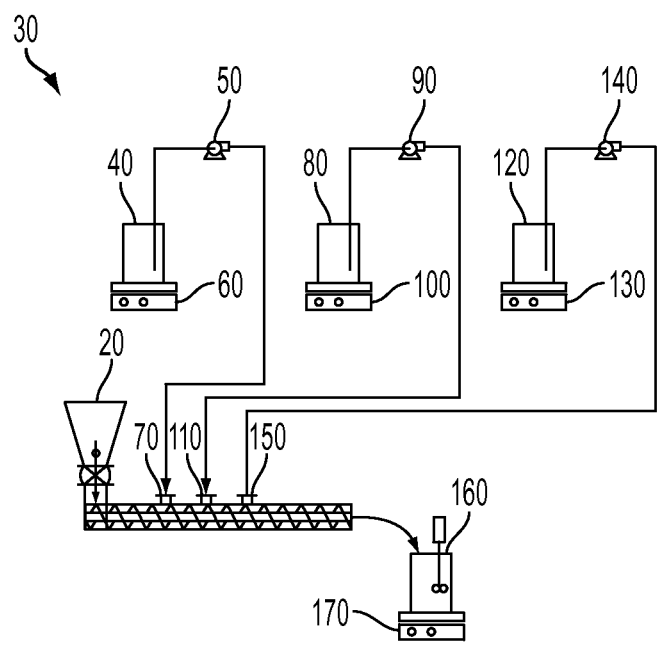
FIG. 2 is a flow chart depicting an extruder process for the preparation of a polyester latex in accordance with Comparative Example 1 of the present disclosure.

An extruder, as depicted in FIG. 2, equipped with a feed hopper and liquid injection ports, was preheated to about 95° C. and set to a rotor speed of about 450 rpm. A propoxylated bisphenol-A based polyester resin was loaded into the hopper of screw feeder 20 which delivered about 380 grams/minute of the mixture to the extruder 30. As the material traveled down the screw feeder and melted, about 21.6 weight % of sodium dodecylbenzene sulfonate (SDBS), commercially available from Tayca Co., preheated to a temperature of about 55° C., was fed to the extruder's first injection port 70 at a feed rate of about 138 ml/minute from vessel 40 via a diaphragm pump 50 and heated via hot plate 60. The surfactant was melt mixed with the resin to produce a homogeneous mixture.

As the mixture traveled down the extruder, about 10 weight % of preheated NaOH solution from a second vessel 80 was fed to the extruder's second injection port 110 at a feed rate of about 41 ml/minute via a diaphragm pump 90 and heated via hot plate 100. As the mixture continued to travel down the extruder, preheated de-ionized water (DIW) from a third vessel 120 was added at the third injection port 150 at a feed rate of about 300 ml/minute via diaphragm pump 140 and heated via hot plate 130. The addition of water provided a transition from a water in oil to an oil in water emulsion ensuring that the materials continued to mix rather than phase separate.

The product collected from the extruder 30 included a stream of latex that was collected in a water bath 160 preheated to 100° C. via hot plate 170 with gentle agitation. This process did not yield an emulsion which could be utilized to form a toner.

Example 1

Solvent-free emulsification of an amorphous polyester resin in the presence of a crystalline polyester resin via extrusion.

An extruder, as depicted in FIG. 3, equipped with a feed hopper and liquid injection ports was preheated to about 95° C. and set to a rotor speed of about 450 rpm. A mixture consisting of about 88.5 wt % propoxylated bisphenol-A based amorphous polyester resin and about 11.5% poly(nonylene-decanoate) crystalline polyester resin was loaded into the hopper of screw feeder 20 which delivered about 380 grams/minute of the mixture to the extruder 30. As the material traveled down the screw feeder and melted, about 21.6 weight % of SDBS, preheated to a temperature of about 55° C., was fed to the extruder's first injection port 70 at a feed rate of about 138 ml/minute from vessel 40 via a diaphragm pump 50 and heated via hot plate 60.

As the mixture traveled down the extruder, about 10 weight % of preheated NaOH solution from second vessel 80 was fed to the extruder's second injection port 110 at a feed rate of about 41 ml/minute via a diaphragm pump 90 and heated via hot plate 100. As the mixture continued to travel down the extruder, preheated de-ionized water (DIW) from third vessel 120 was added at the third injection port 150 at a feed rate of about 300 ml/minute via diaphragm pump 140 and heated via hot plate 130. The addition of water provided a transition from a water in oil to an oil in water emulsion ensuring that the materials continued to mix rather than phase separate.

The product collected from the extruder 30 included a stream of latex that was collected in a water bath 160 preheated to 100° C. via hot plate 170 with gentle agitation.

Figure 4:
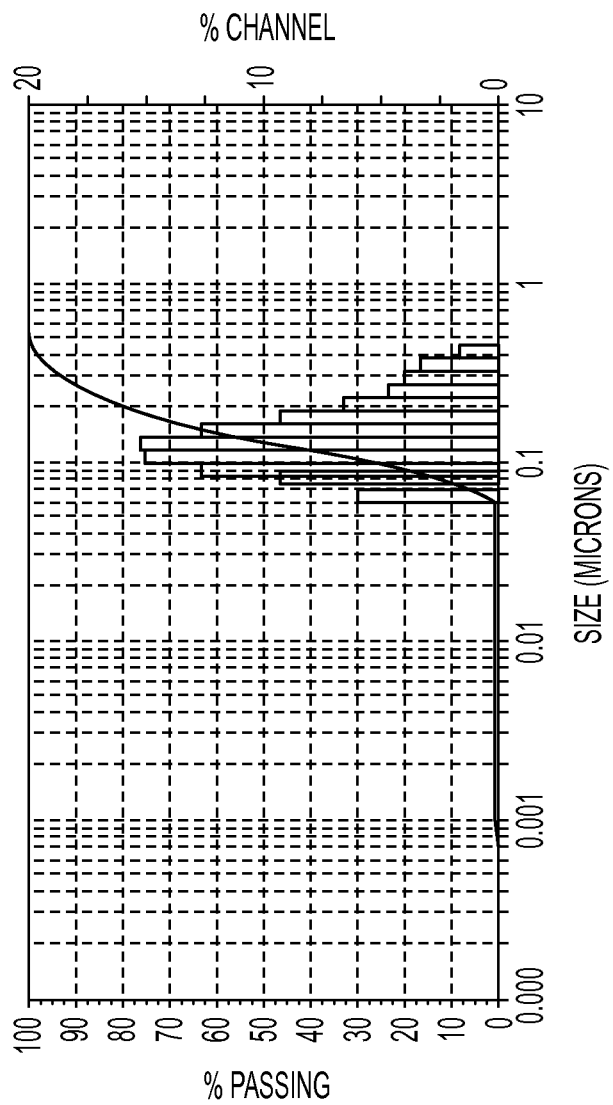
FIG. 4 is a graph depicting particle size distribution for the latex produced in accordance with Example 1 of the present disclosure.

A sample from the latex stream collected was taken and filtered through a 25 μm filter to determine the coarse content, particle size, and particle size distribution, and resin molecular weight of the latex. The coarse content was about 0.1%, the particle size was about 130 nm with a narrow particle size distribution, as shown in FIG. 4. Despite the use of a higher molecular weight amorphous resin in this Example, versus the resin used in Comparative Example 1, the addition of the crystalline polyester resin led to a successful solvent-free emulsification process.

Softening Point

The softening point of the resulting resin was measured by a Metler-Toledo softening point measurement apparatus with the results depicted in FIG. 1. The resin mixture included a combination of at least one amorphous resin and at least one crystalline resin. The melting point of the mixture was about 74° C. As illustrated, as the content of the crystalline resin was increased, the softening point of the resin mixture decreased. When the softening point was depressed to approximately 100° C., a solvent-free process became feasible. Higher temperatures were not possible since, under atmospheric conditions, they would cause water to boil.

Example 2

Solvent-free emulsification of two amorphous polyester resins in the presence of a crystalline polyester resin via extrusion.

Figure 5:
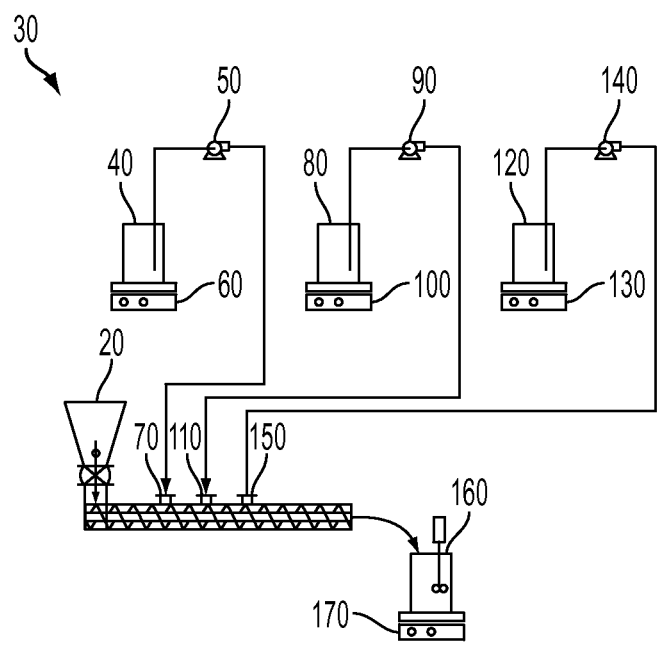
FIG. 5 is a flow chart depicting an extruder process for the preparation of a polyester latex in accordance with Example 2 of the present disclosure.

An extruder, as depicted in FIG. 5, equipped with a feed hopper and liquid injection ports, was preheated to about 95° C. and set to a rotor speed of about 450 rpm. About 44.25 weight % of a propoxylated bisphenol-A based amorphous polyester resin and about 44.25 weight % of a ethoxylated bisphenol-A based amorphous polyester resin and about 11.5 weight % of a poly(nonylene-decanoate) crystalline polyester resin were loaded into the hopper of screw feeder 20 which delivered about 380 grams/minute of the mixture to the extruder 30. As the material traveled down the screw feeder and melted, about 21.6 weight % of SDBS, preheated to a temperature of about 55° C., was fed to the extruder's first injection port 70 at a feed rate of about 138 ml/minute from vessel 40 via a diaphragm pump 50 and heated via hot plate 60.

As the mixture traveled down the extruder, about 10 weight % of preheated NaOH solution from second vessel 80 was fed to the extruder's second injection port 110 at a feed rate of about 41 ml/minute via a diaphragm pump 90 and heated via hot plate 100. As the mixture continued to travel down the extruder, preheated de-ionized water (DIW) from a third vessel 120 was added at the third injection port 150 at a feed rate of about 300 ml/minute via diaphragm pump 140 and heated via hot plate 130. The addition of water provided a transition from a water in oil to an oil in water emulsion ensuring that the materials continued to mix rather than phase separate.

The product collected from the extruder 30 included a stream of latex that was collected in a water bath 160 preheated to 100° C. via hot plate 170 with gentle agitation.

Figure 6:
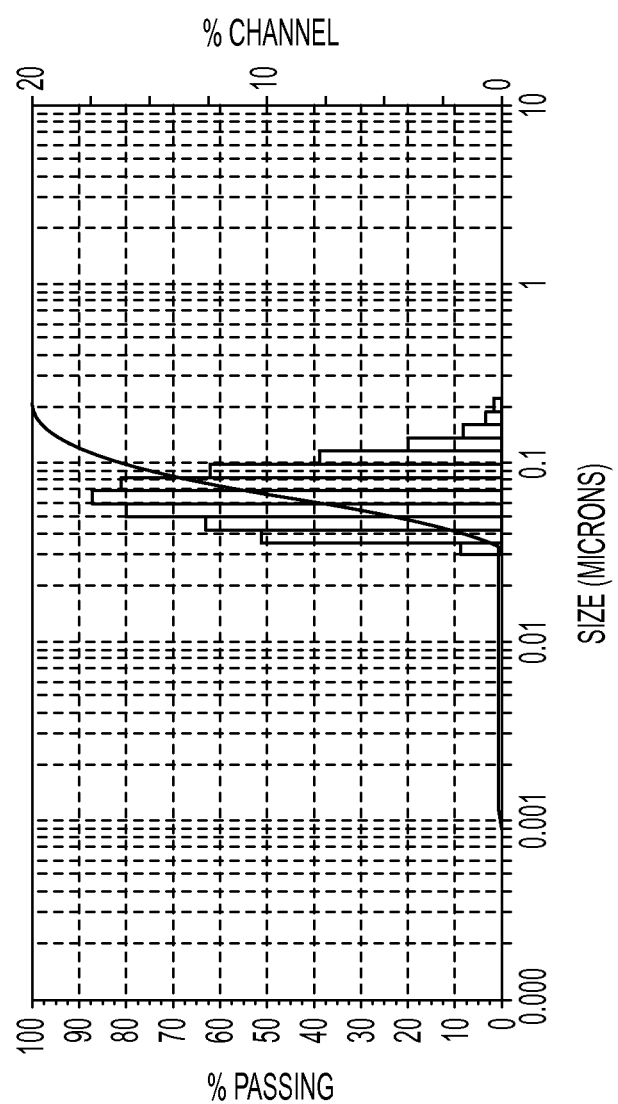
FIG. 6 is a graph depicting particle size distribution for the latex produced in accordance with Example 2 of the present disclosure.

A sample from the latex stream was taken and filtered through a 25 μm filter to determine the coarse content, particle size, and particle size distribution. The coarse content was about 0%, the particle size was about 60 nm with a desirable monomodal and narrow particle size distribution, as shown in FIG. 6. In contrast to Comparative Example 1, the addition of the crystalline polyester resin in small quantities led to a successful solvent-free emulsification process with a high quality latex predominately composed of amorphous resin.

Example 3

Solvent-free emulsification of two amorphous polyester resins in the presence of a crystalline polyester resin via extrusion.

Figure 7:
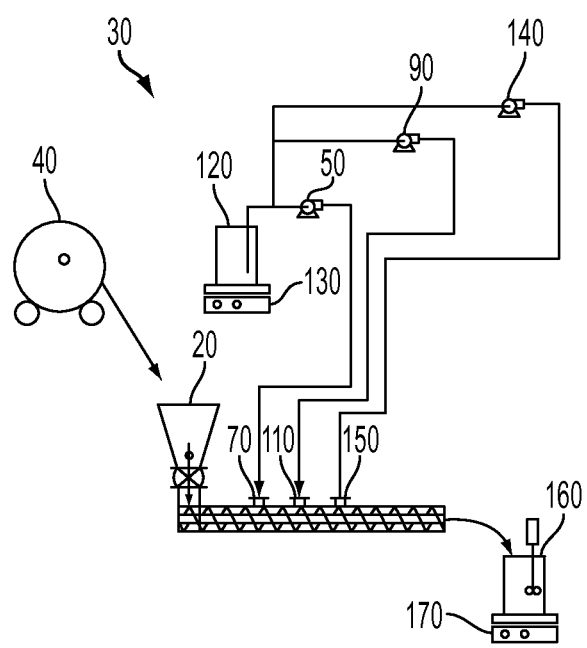
FIG. 7 is a flow chart depicting an extruder process for the preparation of a polyester latex in accordance with Example 3 of the present disclosure.

An extruder, as depicted in FIG. 7, equipped with a feed hopper and liquid injection ports was preheated to about 95° C. and set to a rotor speed of about 450 rpm. About 3.36 kilograms of a propoxylated bisphenol-A based amorphous polyester resin and, about 3.36 kilograms of a ethoxylated bisphenol-A based amorphous polyester resin, about 0.87 kilograms of a poly(nonylene-decanoate) crystalline polyester resin, about 91.2 grams of NaOH, and about 760 grams of SDBS was pre-blended in vessel 40 and then was loaded into the hopper of screw feeder 20 which delivered about 380 grams/minute of the mixture to the extruder 30.

As the mixture traveled down the extruder, preheated deionized water (DIW) was added at three subsequent ports. DIW, from tank 120, heated via hot plate 130, was fed to the extruder's first injection port 70, second injection port 110, and third injection port 150, at feed rates of about 120 ml/minute, about 180 ml/minute, and about 300 ml/minute, respectively, via diaphragm pumps 50, 90, and 140, respectively. The additional water provided for a gradual transition from an water in oil to an oil in water emulsion ensuring that the materials continued to mix rather than phase separate.

The product collected from the extruder 30 included a stream of latex that was collected in a water bath 160 preheated to 100° C. via hot plate 170 with gentle agitation.

Figure 8:
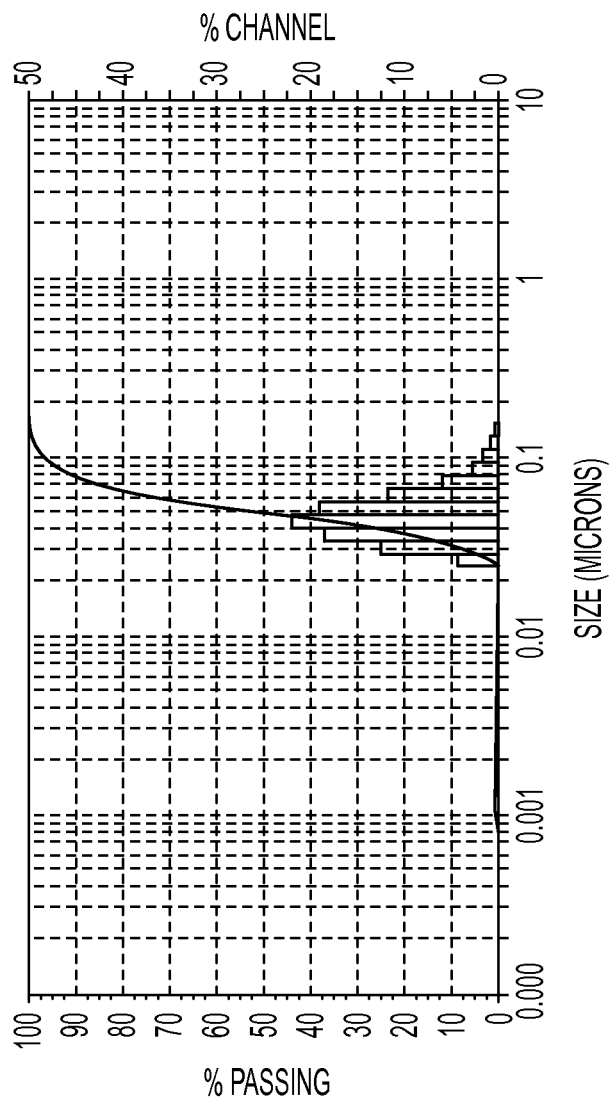
FIG. 8 is a graph depicting particle size distribution for the latex produced in accordance with Example 3 of the present disclosure.

A sample from the latex stream collected was taken and filtered through a 25 μm filter to determine the coarse content, particle size, and particle size distribution. The coarse content was about 0.4%, the particle size was about 50 nm with a desirable monomodal and narrow particle size distribution, as shown in FIG. 8. In contrast to Comparative Example 1, the addition of the crystalline polyester resin in small quantities led to a successful solvent-free emulsification process with a high quality latex predominately composed of amorphous resin.

Comparative Example 2

Solvent-free emulsification of an amorphous polyester resin in the absence of a crystalline resin via a batch process.

Figure 9:
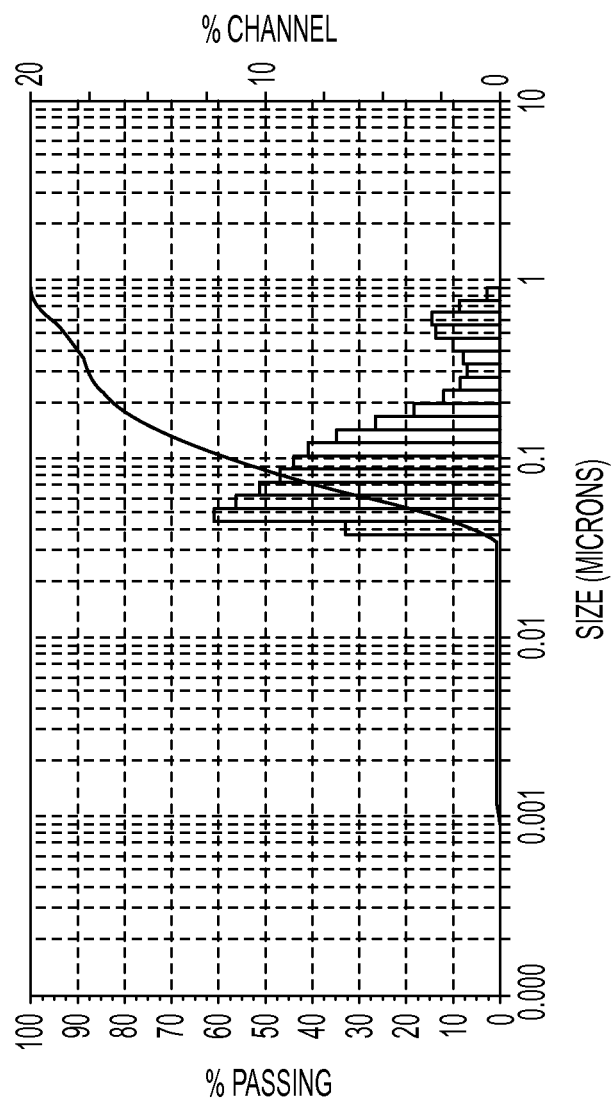
FIG. 9 is a graph depicting particle size distribution for the latex produced in accordance with Comparative Example 2 of the present disclosure.

About 50 grams of a propoxylated bisphenol-A based amorphous polyester resin was loaded into a Haake mixer and melted at a temperature of about 95° C. and at a mixing speed of about 100 rpm. About 1.27 grams of NaOH and about 4 grams of SDBS were added to the resin mixture and the mixture was allowed to melt mix for about 15 minutes. About 11.4 grams of deionized water was added to the mixture and mixing was allowed to continue for about 20 minutes. The melt mixed material was cooled, crushed and added to a kettle with about 400 grams of deionized water preheated to about 95° C. to form the latex. The latex had an undesirable bimodal particle size distribution as shown in FIG. 9 and a high coarse content of about 6.5%. The process led to severe resin degradation.

Example 4

Solvent-free emulsification of an amorphous polyester resin in the presence of a crystalline resin via a batch process.

Figure 10:
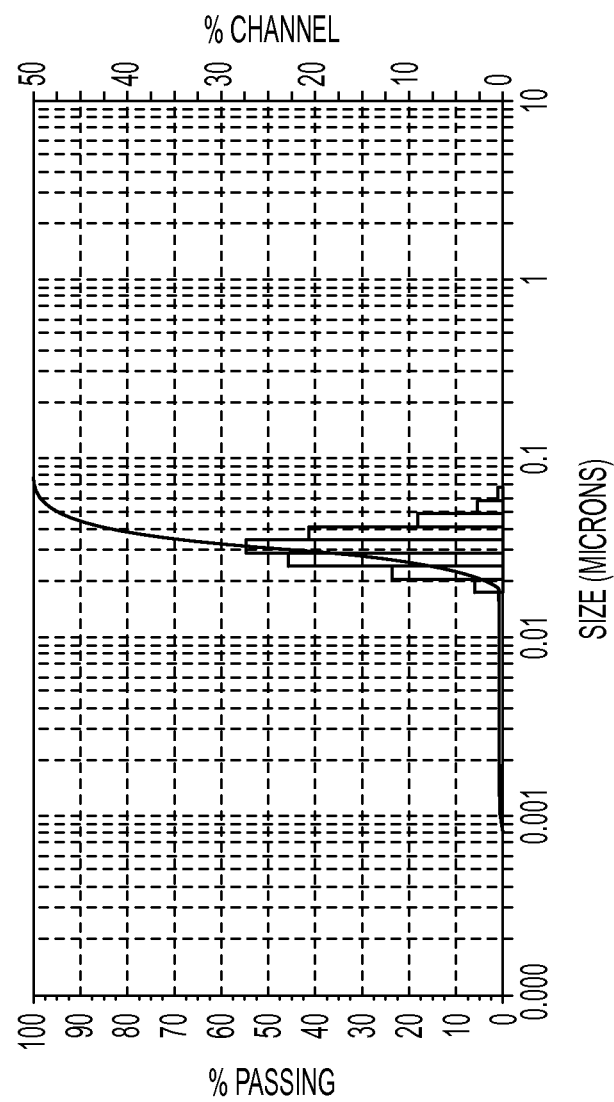
FIG. 10 is a graph depicting particle size distribution for the latex produced in accordance with Example 4 of the present disclosure.

About 45 grams of a propoxylated bisphenol-A based amorphous polyester resin and about 5 grams of a poly(nonylene-decanoate) crystalline polyester resin was loaded into a Haake mixer and melted at a temperature of about 95° C. and at a mixing speed of about 100 rpm. About 1.1 grams of NaOH and about 4 grams of SDBS was added to the resin mixture and the mixture was allowed to melt mix for about 15 minutes. About 8 grams of deionized water was added to the mixture and mixing was allowed to continue for about 20 minutes. The melt mixed material was cooled, crushed and added to a kettle with about 400 grams of deionized water preheated to about 95° C. to form the latex. The latex had a desirable monomodal single peak particle size distribution as shown in FIG. 10 and a low coarse content of about 0.9%.

Toner Preparation

A toner including a core-shell configuration was produced as follows. A toner having a co-emulsified latex of low molecular weight amorphous resin (50.7%) and crystalline resin (6.8%) as produced in Example 4 was utilized to form the core, and a co-emulsified latex of low molecular weight amorphous resin and a high molecular amorphous resin (28%) was utilized to form the shell. The toner was prepared via standard aggregation coalescence, and particle size (D50), volume average particle size distribution index (GSDv), number average particle size distribution index (GSDn), and circularity were measured. The results are set forth in Table 1 below.

TABLE 1

| Toner ID | D50 | GSDv | GSDn | Circularity |
| --- | --- | --- | --- | --- |
| Example 3 | 5.422 | 1.285 | 1.245 | 0.971 |

Blocking/Charging Performance

The blocking performance of the toner made from the latex formed in Example 4 was measured as follows: About two grams of additive toner was weighted into an open dish and conditioned in an environmental chamber at a specified temperature and about 50% relative humidity. After about 17 hours, the samples were removed and acclimated in ambient conditions for about 30 minutes. Each re-acclimated sample was measured by sieving through a stack of two pre-weighed mesh sieves, which were stacked as follows: about 1000 μm on top and about 106 μm on bottom. The sieves were vibrated for 90 seconds at about 1 mm amplitude with a Hosokawa flow tester. The sieves were then reweighed and toner heat cohesion was calculated from the total amount of toner remaining on both sieves as a percentage of the starting weight. Other samples were prepared and measured using varying chamber temperature to generate a plot of percent heat cohesion with temperature.

Figure 11:
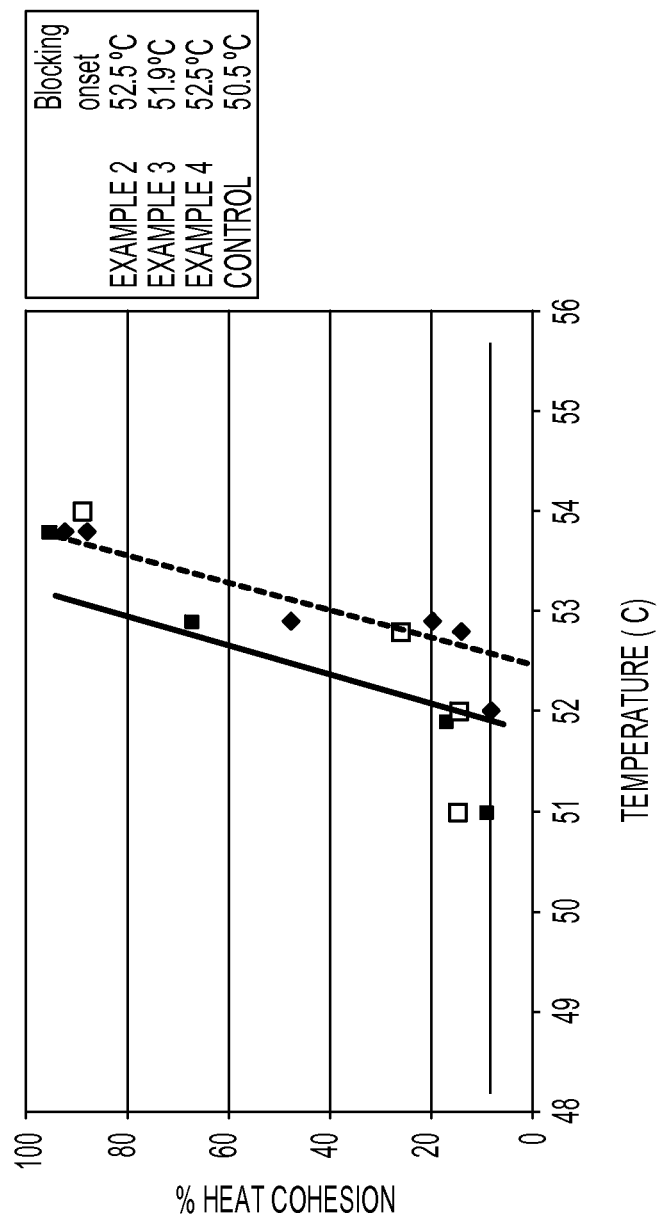
FIG. 11 is a graph depicting toner blocking properties and cohesion of a toner of made in accordance with Examples 2, 3 and 4 of the present disclosure, compared with a control toner made from latexes derived from a solvent emulsification process.

As illustrated in FIG. 11, the blocking onset for the toner of Example 4 was 2° C. higher than the control toner and was acceptable. The use of a crystalline resin in order to depress the softening point of amorphous resins in the emulsification process did not lead to deterioration of blocking or to any signs of plasticization of the resin.

Charging performance of the toner made from the latex formed in Example 4 was measured utilizing the following procedure: Developer samples were prepared by weighing about 0.5 g of additive toner onto about 10 g of xerographic carrier into a washed 60 ml glass bottle. Developer samples were prepared in duplicate as above for each toner that was being evaluated. One sample of the pair was conditioned in the A-zone environment of 28 C/85% RH, and the other was conditioned in the C-zone environment 10 C/15% RH. The samples were kept in their respective environments overnight to fully equilibrate. The developer was then charged by agitating the samples for one hour in a Turbula mixer. The charge on the toner particles was measured using a charge spectrograph (CSG). The toner charge was calculated as the midpoint of the toner charge trace from the CSG. Q/d is reported in millimeters of displacement from the zero line or can be converted to fC/micron by multiplying the value in mm by 0.092. The corresponding Q/m in uC/g was also measured.

As can be noted from Table 2, the charging performance of the toner of Example 4 was equal to that of the control toner. The use of a crystalline resin in order to depress the softening point of amorphous resins in the emulsification process did not lead to deterioration of charging.

TABLE 2

| | Charging performance for toner of Example 4 vs. a control toner | | | | | | |
|---|---|---|---|---|---|---|---|
| | A-Zone | | | C-zone | | Charge Maintenance | |
| Toner ID | 60 minute Q/d | 60 minute Q/m | 2 minute Q/m | 60 minute Q/d | 60 minute Q/m | 24 hour | 7 day |
| Targets | 4 mm < q/cκ11 | | >33 μC/g | | | >80% | >65% |
| Control | 7.5 | 36 | 40 | 13.8 | 55 | 95 | 77 |
| Example 4 | 6.7 | 32 | 40 | 13.8 | 72 | 80 | 70 |

Q/d = toner charge
Q/m = parent toner charge per mass ratio

Gloss/Crease Fix

Unfused test images were made using a Xerox Corporation DC12 color copier/printer. Images were removed from the Xerox Corporation DC12 before the document passed through the fuser. These unfused test samples were then fused using a Xerox Corporation iGen3® fuser. Test samples were directed through the fuser using the Xerox Corporation iGen3® process conditions (100 prints per minute). Fuser roll temperature was varied during the experiments so that gloss and crease area could be determined as a function of the fuser roll temperature. Print gloss was measured using a BYK Gardner 75° gloss meter. Toner adherence to the paper was determined by its crease fix minimum fusing temperature (MFT). Samples were fused onto Color Xpressions+(90 gsm) using the Xerox PATRIOT® fusing fixture at about 220 mm/second. The fused image was folded and about 860 grams weight of toner was rolled across the fold after which the page was unfolded and wiped to remove the fractured toner from the sheet. This sheet was then scanned using an Epson flatbed scanner and the area of toner which had been removed from the paper was determined by image analysis software such as the National Instruments IMAQ.

Figure 12:
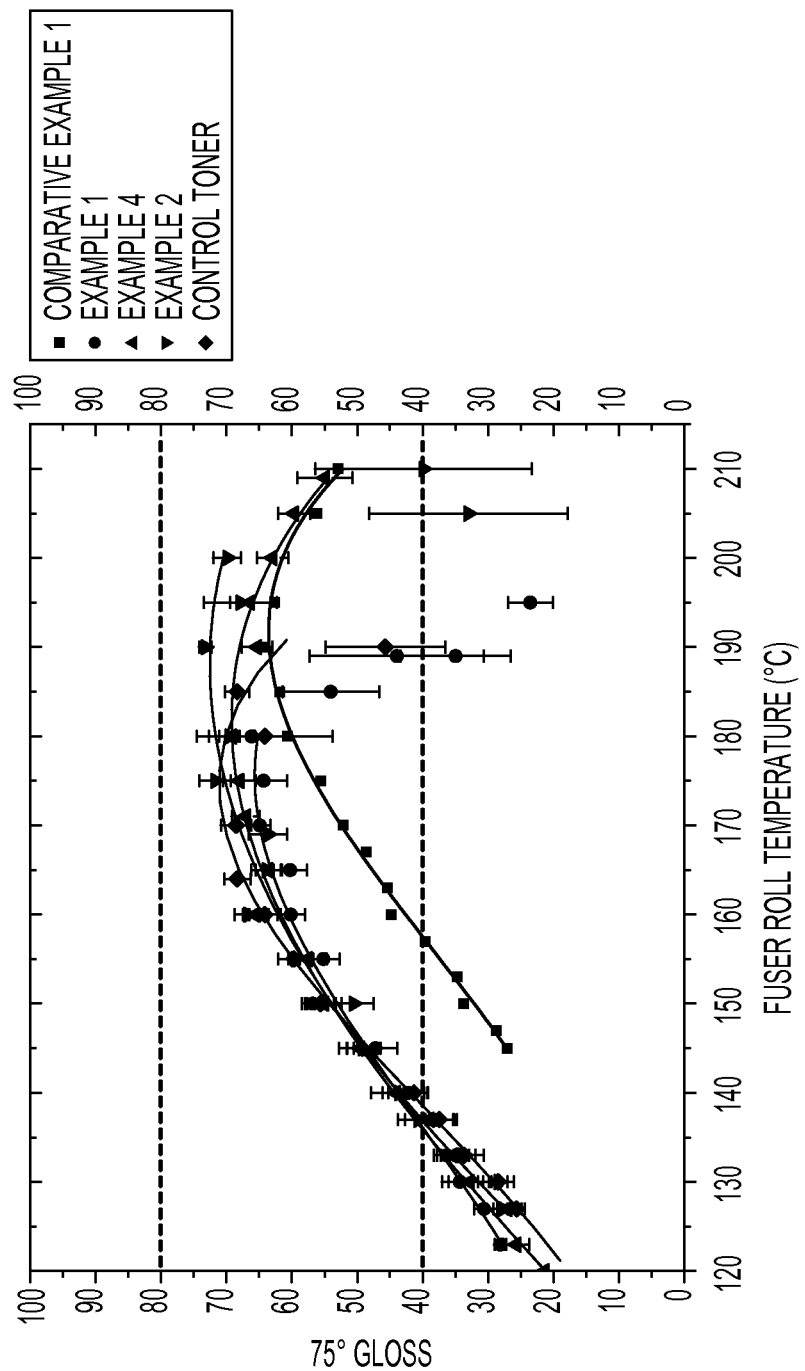
FIG. 12 is a graph depicting gloss values obtained for toners of the present disclosure produced in the Examples compared with a control toner made from latexes derived from a solvent emulsification process.
Figure 13:
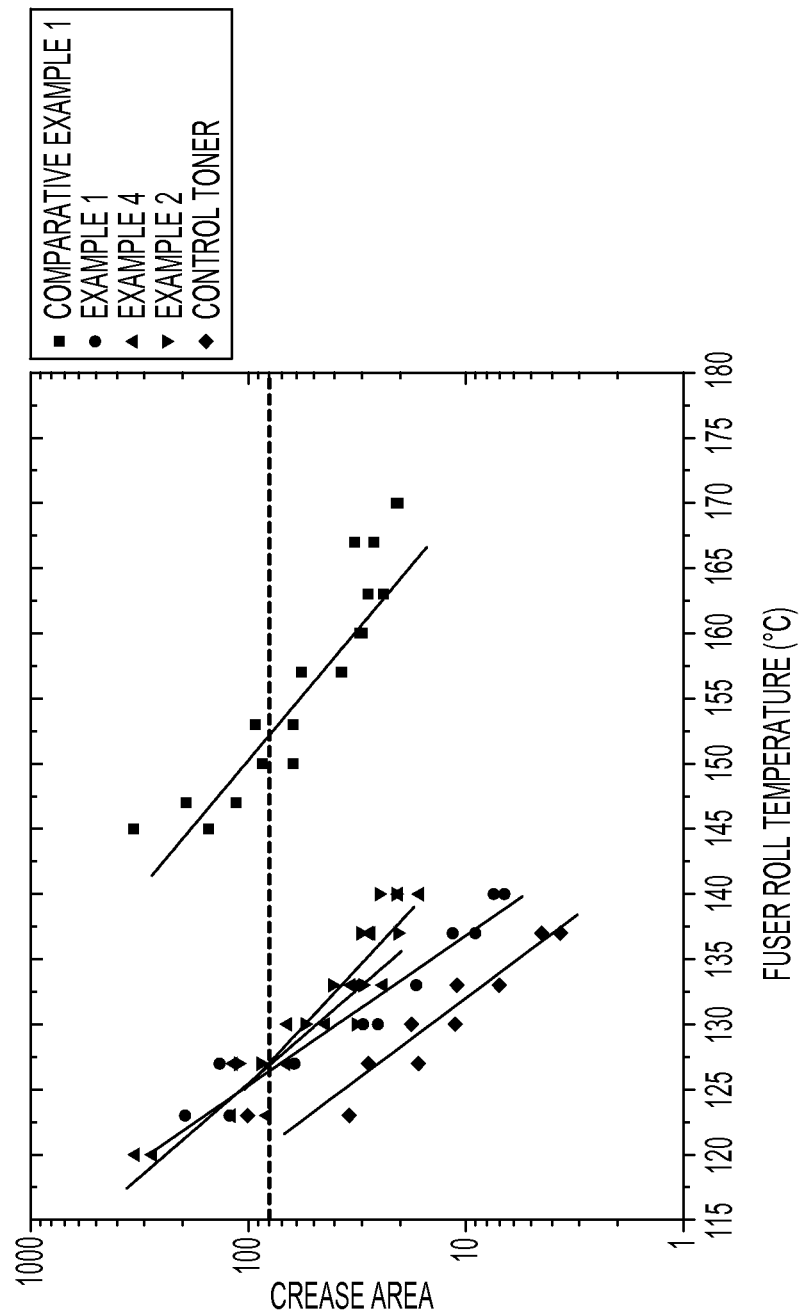
FIG. 13 is a graph depicting crease performance values obtained for toners of the present disclosure produced in the Examples compared with a control toner made from latexes derived from a solvent emulsification process.

The toner of Example 4 had a similar gloss and crease performance when compared to samples made with conventional phase inversion emulsion process. The toner of Example 4 reached 40 gloss units with the fuser roll temperature at 147° C. and had a ultra-low crease fix MFT of 127° C. The hot offset of the toner of Example 4 was at a higher temperature than the bench scale control toner. As illustrated above in Example 4, the solvent free latex was made by emulsifying amorphous resin and crystalline resin together. The ratio of high molecular weight resin to low molecular weight resin in the toner of Example 4 was different from the standard control formulation, however this difference in formulation did not impact the time zero fusing performance as shown in FIGS. 12 and 13. As can be noted from this data, the fusing performance of the toner of Example 4 was equal to that of a standard control toner.

For the toner of Example 4, the minimum fixing temperature was about 158° C., the hot-offset temperature was about 210° C., the fusing latitude was about 60° C., and the peak gloss was about 65.

It was thus observed, that despite an effective neutralization, a high quality solvent free latex (narrow particle size distribution and low coarse content) is difficult to form on account of the high viscosity of the amorphous resin phase (see comparative examples). This is not the case for the crystalline latex where high quality solvent-free latexes were achieved on account of the low resin viscosities with a high melting point.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
contacting at least one amorphous polyester resin with a viscosity reducing additive consisting of a crystalline polyester resin, wherein said additive is present in an amount of about 2%, in the absence of an organic solvent, to form a resin mixture having a softening point temperature of from about 95° C. to about 120° C. and a viscosity of from about 10 to about 1,000,000 Pa*S at about 130 C;
contacting the resin mixture with a surfactant and a neutralizing agent;
melt mixing the mixture;
contacting the melt mixed resin mixture with de-ionized water to form an emulsion; and continuously recovering latex particles.

2. A process according to claim 1, wherein the surfactant is selected from the group consisting of sodium dodecylsulfates, sodium dodecylbenzene sulfonates, sodium dodecyl naphthalene sulfate, dialkyl benzenealkyl sulfates, dialkyl benzenealkyl sulfonates, abitic acid, alkyl diphenyloxide disulfonates, branched sodium dodecyl benzene sulfonates, polyvinyl alcohol, polyacrylic acid, methalose, methyl cellulose, ethyl cellulose, propyl cellulose, hydroxyethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}$ trimethyl ammonium bromide, $C_{15}$ trimethyl ammonium bromide, $C_{17}$ trimethyl ammonium bromide, dodecylbenzyl triethyl ammonium chloride, cetyl pyridinium bromide, and combinations thereof; and wherein the neutralizing agent is selected from the group consisting of ammonium hydroxide, potassium hydroxide, sodium hydroxide, sodium carbonate, sodium bicarbonate, lithium hydroxide, potassium carbonate, aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

3. A process according to claim 1, wherein the at least one amorphous polyester resin is present in an amount of from about 50 percent by weight to about 98 percent by weight of the resin mixture.

4. A process according to claim 1, further comprising contacting the latex particles with an optional colorant and an optional wax, and optionally a second amorphous polyester resin to form a shell over the latex particles.

5. A process according to claim 1, wherein the latex particles have a solids content of from about 10% to about 50%.

6. A process comprising:
contacting at least one crystalline polyester resin with at least one amorphous polyester resin, in the absence of an organic solvent, wherein the at least one crystalline resin is present at about 2 weight %, to form a resin mixture having a softening point temperature of from about 95° C. to about 120° C. and a viscosity of from about 10 to about 1,000,000 Pa*S at about 130° C.;
contacting the mixture with a surfactant and a neutralizing agent;
melt mixing the mixture;
contacting the melt mixed mixture with de-ionized water to form an oil in water emulsion; and continuously recovering latex particles.

7. A process according to claim 6, wherein the surfactant is selected from the group consisting of sodium dodecylsulfates, sodium dodecylbenzene sulfonates, sodium dodecyl naphthalene sulfate, dialkyl benzenealkyl sulfates, dialkyl benzenealkyl sulfonates, abitic acid, alkyl diphenyloxide disulfonates, branched sodium dodecyl benzene sulfonates, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}$ trimethyl ammonium bromide, $C_{15}$ is trimethyl ammonium bromide, $C_{17}$ trimethyl ammonium bromide, dodecylbenzyl triethyl ammonium chloride, cetyl pyridinium bromide, and combinations thereof; and wherein the neutralizing agent is selected from the group consisting of ammonium hydroxide, potassium hydroxide, sodium hydroxide, sodium carbonate, sodium bicarbonate, lithium hydroxide, potassium carbonate, aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-di azabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

8. A process according to claim 6, wherein the at least one amorphous polyester resin is utilized in amounts of from about 50 weight % to about 98 weight % of the resin mixture.

9. A process according to claim 6, further comprising contacting the latex particles with an optional colorant and an optional wax, and optionally a second amorphous polyester resin to form a shell over the latex particles.

10. A process according to claim 6, wherein the latex particles have a solids content of from about 10% to about 50%.

11. A process comprising:
contacting at least one crystalline polyester resin with at least one amorphous polyester resin, in the absence of an organic solvent, wherein the at least one crystalline resin is present at about 2 weight %, to form a resin mixture having a softening point of from about 95° C. to about 120° C. and a viscosity of from abut 10 to about 1,000, 000 Pa*S at about 130° C.;
contacting the mixture with a surfactant and a neutralizing agent;
melt mixing the mixture;
contacting the melt mixed mixture with de-ionized water to form an oil in water emulsion;
continuously recovering latex particles; and contacting the latex particles with an optional colorant and an optional wax, and a second amorphous polyester resin to form a shell over the latex particles, thereby forming toner particles.

12. A process according to claim 11, wherein the surfactant is selected from the group consisting of sodium dodecylsulfates, sodium dodecylbenzene sulfonates, sodium dodecyl naphthalene sulfate, dialkyl benzenealkyl sulfates, dialkyl benzenealkyl sulfonates, abitic acid, alkyl diphenyloxide disulfonates, branched sodium dodecyl benzene sulfonates, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}$ trimethyl ammonium bromide, $C_{15}$ trimethyl ammonium bromide, $C_{17}$ trimethyl ammonium bromide, dodecylbenzyl triethyl ammonium chloride, cetyl pyridinium bromide, and combinations thereof.

13. A process according to claim 11, wherein the at least one amorphous polyester resin utilized in amounts of from about 50 weight % to about 98 weight % of the resin mixture.

14. A process according to claim 11, wherein the latex particles have a solids content of from about 10% to about 50%.

15. The process of claim 1, wherein the latex particles have a particle size of from about 30 nm to about 500 nm.

16. The process of claim 6, wherein the latex particles have a particle size of from about 30 nm to about 500 nm.

17. The process of claim 11, wherein the latex particles have a particle size of from about 30 nm to about 500 nm.

* * * * *